United States Patent [19]

Felter et al.

[11] Patent Number: 4,981,891

[45] Date of Patent: Jan. 1, 1991

[54] STATIC DISSIPATIVE COMPOSITION

[75] Inventors: Richard E. Felter, Lancaster; Deborah L. Musser, Columbia, both of Pa.

[73] Assignee: Armstrong World Industries, Inc., Lancaster, Pa.

[21] Appl. No.: 468,428

[22] Filed: Jan. 22, 1990

Related U.S. Application Data

[63] Continuation-in-part of Ser. No. 269,056, Nov. 9, 1988, Pat. No. 4,895,886.

[51] Int. Cl.$^5$ ............................................. C08K 3/36
[52] U.S. Cl. ................................... 524/247; 524/249; 524/913
[58] Field of Search ................ 526/247, 249, 913, 156

[56] References Cited

U.S. PATENT DOCUMENTS 4,268,583  5/1981  Hendy .................................. 428/910

Primary Examiner—Joseph L. Schofer
Assistant Examiner—Jeffrey T. Smith

[57] ABSTRACT

Coating compositions and their preparation are described. The compositions can be used to give surfaces a decreased electrical surface resistivity. Choline antistats are used in amounts of about 2% or less by weight, and are combined with long chain quaternary ammonium salt antistats, in a solution with a binder to give antistatic or stat dissipative coating compositions.

14 Claims, No Drawings

STATIC DISSIPATIVE COMPOSITION

CROSS-REFERENCE TO RELATED APPLICATION

This application is a continuation-in-part of U.S. Ser. No. 269,056, filed Nov. 9, 1988, now U.S. Pat. No. 4,895,886 entitled "Static Dissipative Composition".

FIELD OF THE INVENTION

The invention relates to coatings which dissipate static. More particularly, the invention relates to a static dissipative composition which can be coated on appropriate surfaces, such as plastic.

BACKGROUND OF THE INVENTION

Antistatic and/or static dissipative coatings are known from U.S. Pat. Nos. 4,089,997; 4,278,578; $\propto$,322,331; 4,459,352; 4,556,506; 4,596,668; and 4,642,263. Effective agents described in these patents include: polystyrene sulphonic acid, co(ethylene/maleic acid) sodium salt, aliphatic polycarboxylic acid, potassium cellulose succinate, metal flakes, n-alkyl dimethyl benzyl, quaternary ammonium chloride, cetylpyridinium chloride, stearamidopropyl dimethyl-beta-hyroxyethyl ammonium nitrate and N,N,N,N',N'-pentamethyl-N' tallow trimethylene diammonium-bis (methyl sulfate). These agents can be formulated in a range of coating compositions which can be photopolymerized or crosslinked to provide permanent antistatic protection. Static dissipative materials typically have resistivities in the range of $10^6$ to $10^9$ ohm/square, and antistatic materials have resistivities in the range of $10^9$ to $10^{12}$ ohm/sq.

Despite what is known in the art, a need still exists for a static dissipative (antistatic) composition which can be applied as a liquid or aerosol spray to produce clear or pigmented permanent coatings.

SUMMARY OF THE INVENTION

It has been discovered that small amounts of a choline based antistat can be combined with a long chain quaternary ammonium salt in a solvent solution to produce a coating composition that will produce a film giving an unusually good reduction in surface resistivity. The coating composition can be used for slight reductions in surface resistivity, or it can provide an either antistatic or a static dissipative film.

Surprisingly small concentrations of antistat ingredients can be used in the coating compositions to provide these reductions. Thus, when a film is made with such coating compositions, it will have surprisingly superior properties in conductivity. Desirable, and superior properties of film appearance, and water resistance can also be obtained.

The instant coating compositions includes airless sprays, aerosol sprays, and the type of coatings that can be applied by such means as paint-coating.

These coating compositions, on a percent by weight basis, comprise from about 1 to about 60% of a solvent-compatible binder; from about 40 to about 90% of a solvent vehicle; up to about 2% of a choline antistat; and a quaternary ammonium long chain salt antistat.

The amount of long chain quaternary ammonium salt antistat used is widely variable, but it should not be present in a concentration that is very much less than the amount of choline antistat present in order to fully optimize the conductivity. The concentration ratio of long chain quat:choline could acceptably reach about 0.8 (0.8:1), but it should not go very much lower in order to obtain the fullest benefit of the conductivity properties possible from the combination and to preserve good film properties. The long chain quaternary ammonium salt antistat concentration can go to virtually any amount possible in the solution. Since, however, no change is seen in conductivity at concentration ratios over about 2.8, the long chain quat concentration may be moderated (to a maximum of about 2.8).

The instant coating composition is referred to as a "solution" herein, the choline based antistat, and the long chain quat antistat being dissolved in it; but, it should be pointed out that some of the embodiments included will have some solids. The solids could include an inorganic particulate, and/or a pigment. Excellent antistatic and static dissipative films can also be obtained from coating compositions in which the polymer-binder is a film-forming polymer which is not completely soluble in the solvent. The coating compositions having solvent compatible film-forming binders or partially soluble polymer binders can suitably be applied as a painted coating (paintable coatings). For the spray compositions, and especially the aerosol sprays, a soluble binder is preferred.

Keeping the concentration ratio of the quat:choline at about 0.8 or greater will also help to preserve good film properties. Preferably the long chain quat is present at an amount that is about equal to or slightly greater than the amount of the choline based antistat used (for a ratio of at least about 1:1). More preferably the concentration ratio ranges from about 1.0 to about 2.5.

In the preferred spray embodiments the binder is used at from about 10 to about 30% by wt.; the solvent is used at from about 70 to about 80% by wt.; the long chain quat is used at from about 1.6 to about 2.4% by wt.; and the choline based antistat is used at from about 1 to about 1.5% by wt.

In other embodiments there can also be a member selected from the group consisting of: an inorganic particulate and a pigment. A suitable concentration for such ingredients being from about 1.5 to about 7% by wt. for each one.

Some preferred embodiments relate to aerosol sprays. A non-aqueous antistatic coating composition that also could be packaged as an aerosol spray if one is needed, comprises (1) 1–1.5 parts of a choline antistat, (2) 1.6–2.4 parts of one or more long chain quarternary ammonium antistat, (3) 70–90 parts of a solvent vehicle, (4) a polymer binder, and (5) an inorganic particulate, with the parts by weight of (1)–(5) totalling to an amount in the range of from 87.1 to 123.9.

A preferred composition for aerosol spray application comprises in parts by weight:

| | |
|---|---|
| Polymethylmethacrylate | 13 |
| Toluol | 18 |
| Methyl ethyl ketone | 30 |
| Methyl isobutyl ketone | 8 |
| Isopropyl alcohol | 14 |
| Propylene glycol methyl ether acetate | 5 |
| Fumed silica | 1.2 |
| TiO$_2$ | 3 |
| Ethyl bis(polyethoxyethanol) alkyl ammonium ethyl sulphate | 1 |
| Dimethyl-ethyl ammonium ethosulphate | 1 |
| Choline methosulphate | 1.2 |
| Pigment dispersant | .01 |

A 2 mil pigmented coating on a vinyl substrate provides a surface resistivity of $10^7$ ohm/sq. at 50% RH.

A method for preparing a coating or spray antistatic composition comprising the steps:
(a) dissolving a choline antistat and one or more long chain quaternary ammonium antistats in an alcohol,
(b) dissolving a polymer binder in organic solvent,
(c) blending an inorganic particulate into (b) to homogeneous consistency, and
(d) adding (a) to (b) with constant stirring to produce a storage stable composition.

DETAILED DESCRIPTION OF THE INVENTION

Beneficially, when the long chain quat and the choline antistat are combined in a coating solution, with the choline antistat being minimized to an amount less than about 2% by weight (wt.), lower electrical surface resistivity is obtained than could be obtained from either one separately. This is true even if larger amounts of the quat or moderately larger amounts of the choline antistat are used.

Although better conductivity could be obtained by using very large amounts of the choline antistat, these amounts of the choline are disadvantageous. Sweating will be noted, and the hygroscopic nature of the choline will destroy the desired film properties, and the levels of conductivity will not be as permanent since the choline will "sweat out" as time goes on. With the quat:choline combination, the hygroscopic action of the choline develops when the choline antistat concentration reaches a level between about 2.22 and 2.26% by wt. Hygroscopicity (sweating) is thus avoided by keeping the choline antistat at a concentration of about 2% by wt. or less. Advantageously, the long chain quat prevents the choline antistat from becoming hygroscopic.

The improvement in conductivity obtained from the long chain quat/choline combination tends to level off so that the conductivity obtained from a film made with a coating solution having a choline antistat concentration at abut 1.7 or about 1.8% by wt. will not be very much better than the conductivity that is obtained from a film made with a coating solution having about 2.26% by wt. of the choline antistat alone, (although a very slight improvement over the 1.8% level is possible by pushing the choline concentration up to about 2.0% by wt. in combination with the long chain quat). Note Examples 7 and 8 herein. For this reason, therefore, and to avoid choline hygroscopicity, the maximum concentration of the choline antistat acceptably is about 2% by wt. A preferred amount is less than about 1.8% by wt.

In addition to the above, the desired film properties such as uniformity of the film, permanency of the reduction in surface resistivity, and the ability of the conductive film to withstand wiping with a damp cloth without water spotting will begin to deteriorate at even higher choline antistat concentrations. This is true even if the long chain quat concentration is increased. Higher choline antistat concentrations, therefore, should be avoided.

By the activity seen, it can be concluded that the long chain quaternary ammonium salts seem to have the ability to prevent the choline antistat from taking its ordinarily hygroscopic crystalline form when lower choline antistat concentrations are maintained. While not wanting to be bound by theory, it is felt that the long chain quaternary ammonium salt "solubilizes" these small amounts of choline antistat and gives it a non-hygroscopic and more highly conductive form.

The undesirable properties of the choline antistat are avoided with the presence of the long chain quat, so the amount of binder used can permissively be minimized. The amount of binder used can really be determined by individual needs. If, for example, a film is needed only for a short time a small amount of binder can be used. Films made from compositions with less binder can be removed more easily. The reduced surface resistivity is obtained from the antistat ingredients alone; the polymer-binder adds permanency.

The amount of binder needed for a particular case will be affected by the degree of permanency needed from the film. For the more permanent films, more polymer can be used in the coating composition. If no polymer is used there will be a reduction in surface resistivity, but the combined antistat ingredients will be easily wiped from the surface.

The polymer-binder can be used at an amount in the range of from about 1 to about 60% by weight (wt.) of the coating composition. A preferred range is from 5 to 57%, or more preferably from about 10 to about 45% by wt. Different amounts of polymer-binder, however, might be preferred for the different forms that the coating composition can have. When either an airless or an aerosol spray is used, the polymer-binder preferably is in the range of from about 5 to about 25% by wt.; and more preferably, it is in the range of from about 10 to about 20% by wt. For the airless sprays, higher viscosities might be desirable. In either case, however, thickeners can be used to increase the viscosity. For paintable coating compositions the polymer-binder can easily be used at the higher concentrations.

Although the amount desired in a single case will depend on individual requirements, a solution having at least about 0.5% by wt. of choline antistat in the coating composition is recommended to give a film having an antistat resistivity level. The long chain quat is also present in the solution, acceptably at an amount giving a concentration ratio of at least about 0.8.

Acceptably, the choline antistat can range from about 0.5 to about 2 wt. %, and the long chain quat can range from about 0.4 to about 3 wt. % (of the coating composition). A preferred range for each of them is from about 1 to about 1.5 wt. % of the choline antistat, and from about 1.6 to about 2.4 wt. % of the long chain quat in the coating composition.

A large variety of polymers and resins can be used as the binder. The polymer or resin can be selected from virtually any such solvent soluble or solvent miscible film forming polymers or resins. Compatible mixtures of these materials can also be used. An acceptable binder can be selected from the group consisting of a polyurethane, a vinyl copolymer, an acetate polymer, an acrylate polymer, an acrylate copolymer, and an epoxy. Preferably, the binder will be an acrylate polymer or copolymer. A preferred binder can be selected from the group consisting of polymers and copolymers of methyl methacrylate, methyl/butyl methacrylate, ethyl methacrylate, isobutyl methacrylate and butyl methacrylate.

It has been discovered that a combination of binder, coalescence agent and two or more antistatic agents provides a clear and hard surface coating. Hygroscopicity, and "sweating" of the choline salt out of the coating does not occur even at high humidities if the choline salt antistat is at a maximum of about 2% by weight with at least one long chain quaternary antistat.

It was unexpected to find that two antistat agents together synergistically provide more superior electrical and physical properties than would be possible for them separately. A hygroscopic antistat "diluted" with a long chain quat that has inadequate electrical conductance, behaves as if it is present at a higher concentration and instead had not been diluted. The coat formed has superior physical properties and appearance, especially at high relative humidity (RH).

Choline salts are widely used as antistats, and are commercially available. Choline salts are suitable as the choline based antistat in the instant compositions.

Choline methosulphate is a crystalline solid which melts below 150° F. with the structure:

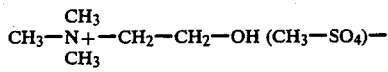

Other similar antistats which could be substituted for choline methosulphate include:

Choline hydroxide
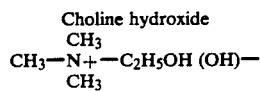

Choline chloride
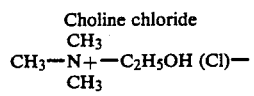

as well as modified cholines such as 2,3-epoxy propyl trimethylammonium chloride, 3-chloro-2-hydroxy propyl trimethyl ammonium chloride, and 3-trimethyl ammonium-1-propanol methyl sulphate.

Quaternary ammonium salts having one or more of a long Hydrocarbon chain are commercially available. Any of such compounds could be used. A molecular weight of at least about 300 is preferred.

Preferred quaternary ammonium salt antistats with higher molecular weight and at least one long chain include cocotrimethyl ammonium chloride, ethyl bis(-polyethoxy ethanol) alkyl ammonium ethyl sulphate and fatty acid modified dimethyl-ethyl ammonium ethosulphate.

A large variety of polymers and resins can be used as the binder. The polymer or resin can be selected from virtually any such solvent soluble or solvent miscible film forming polymers or resins. Compatible mixtures of these materials can also be used. An acceptable binder can be selected from the group consisting of a polyurethane, a vinyl copolymer, an acetate polymer, an acrylate polymer, an acrylate copolymer, and an epoxy. Preferably, the binder is dissolved in a solvent. A preferred binder can be selected from the group consisting of polymers and copolymers of methyl methacrylate, methyl/butyl methacrylate, ethyl methacrylate, isobutyl methacrylate and butyl methacrylate. A most preferred binder is an acrylate polymer or copolymer.

For a solvent composition, it is preferred to use a binder of polymethylmethacrylate (PMMA). Other polymer binders can also be used alone or in combination. For example such as: polyurethane, polyester, epoxy, melamine, vinyl, and vinyl copolymer resins. Polyurethane provides an excellent binder for an aqueous coating composition.

The wide variety of suitable solvent compatible film-forming polymers and resins allows a variety of binder-solvent combinations to be used. A suitable solvent can be any solvent or mixture of solvents that keeps the choline based antistat together with the long chain quaternary ammonium salt dissolved at the concentrations desired. Depending on the particular needs, whether forming a paintable antistat coating composition, or a sprayable one, a suitable polymer or resin binder is then selected from those available.

Permissibly, the coating composition can include solvents which would not dissolve the antistats by themselves; coating compositions are formed from such mixtures by first dissolving the antistats in a solubilizing solvent and then mixing in the other ingredients. Alcohols are very suitable antistat solvents. The lower alcohols will be most suitable, with butanol and isobutanol being good as cosolvents. Preferably the solvent for the antistats is selected from the group consisting of methanol, ethanol, propyl alcohol, and isopropyl alcohol. Of course, other solvents can be found or added with the binder which will form the coating composition upon combining the antistat portion. The solvent or liquid carrying the binder portion will depend on the particular binder selected. Some of these could include, for example, toluene, ketones, ethers, chlorinated hydrocarbons, and alcohols. Surfactants or solubilizing agents could also be used.

While other similar organic solvents can be employed, it is preferred to use isopropyl alcohol to dissolve the antistatic agents and a combination of toluene, methyl ethyl ketone and methyl isobutyl ketone for the binder, particularly the acrylate polymers and copolymers.

A coalescing agent such as propylene glycol methyl ether acetate (PGMEA) provides good film forming properties in the composition of the invention. Other agents include pyrol and cellosolve acetate.

Inorganic particulates such as fumed silica, $TiO_2$, ZnO, and $Al_2O_3$ serve to stabilize the composition by preventing phase separation of antistatic agents. A preferred particulate is fumed silica commercially available as Aerosil ® 200 from Degussa. Fumed silicas are capable of forming a chain structure in the binder.

While the composition can be clear and transparent, it is also possible to add colored pigment. Color variations are possible using pigments such as carbon black, iron oxide, and organic pigments. For electrical performance and permanency, a $TiO_2$ pigmented composition is preferred.

A pigment dispersant may also be added when the composition is pigmented rather than clear or translucent. A preferred dispersant is Nuosperse ® 657 from Nuodex Inc., a HULs Company, Piscataway, N.J.

The composition may also contain other ingredients like crosslinkers, and/or ingredients selected from the group consisting of thickeners, surfactants and defoamers. Carbodiimide is a preferred crosslinker.

The homogeneous composition of the invention can be conveniently packaged in an aerosol can to produce a fine spray. Useful propellants include fluorocarbons, hydrocarbons, $CO_2$, NO, etc. It is preferred to use Dymel ® 22 from DuPont, a non-photochemically active fluorocarbon. By applying a uniform spray, it is possible to produce a continuous 1 to 2 mil film on a surface to be protected such as for electrostatic decay (ESD) applications. Packaged in aerosol form, the composition of the invention provides superior ESD and coating uniformity compared to existing aerosol products such as Miller-Stephenson MS-482 which propells aluminum powder onto the surface to be protected, and cannot therefore provide a clear or translucent coating.

The description thus far has discussed the concentrations in terms of the coating composition itself. Since the film is formed by solvent evaporation, it will be appreciated that the film formed with these coating compositions will be made up of the solids remaining after evaporation, and the ingredient concentrations of the films will be based on these remaining solids.

Problems caused by the choline's hygroscopic nature will not occur in the film made with these liquid coating compositions.

When a permanent film having static dissipative resistivities is desired, it is usually preferred to maintain the combination of antistat agents in the film at a solids concentration of from about 12 to about 25% by wt. along with from about 3 to about 6% fumed silica. For static dissipation, the combination of antistat agents is preferred to be at least about 15% by wt. of the solid film. For an antistatic film, less can be used, depending on requirements. As little as about 2% by wt. can be used in the film, but preferably, at least about 5% by wt. of antistat agents is in the solid film. Preferably, the films will have from about 3 to about 6% by wt. fumed silica (based on the solid film).

These compositions have industrial applicability for ESD facilities and processes where sensitive electronic components can be damaged by even small static discharge.

SURFACE RESISTIVITY MEASUREMENTS

Surface resistivities were tested according to ASTM D-257 using an Electrotech Systems Inc. Resistivity Probe (Model 802) "IKE PROBE". An 11-lb. weight applied force to the probe in all measurements. A Dr. Theidig Milli-To 2 wide range resistance meter was connected to the probe for direct digital readout of resistance. The tests conducted at 50% RH were set up in a room controlled at 50±1% RH and 23±1° C. temperature. The tests conducted at 15% RH were set up in a dry box controlled at 14±2% RH and 23±1° C. temperature.

The following examples illustrate the practice of the invention without being exhaustive. Example 1 represents the best mode.

Films in these examples have been classed as hygroscopic when it was noted that beads of water had accumulated on them.

In these examples, "permanency" means that the reduction in surface resistivity remains for extended periods. If the surface resistivity did not remain it was classed as not permanent (indicated in the tables by "no"). Surviving a damp wipe means that the film can be cleaned off with a damp cloth and the reduced surface resistivity will not be harmed.

EXAMPLE 1

A. Solution

An isopropyl alcohol solution was prepared by mixing together in parts by weight:

| | |
|---|---|
| Ethyl bis(polyethoxyethanol) alkyl ammonium ethyl sulphate (Varstat ® 66 from Sherex Chemical Corp. | 1 |
| Fatty acid modified dimethyl-ethyl ammonium ethosulphate (Larostat ® 264A from Mazer Chemicals) | 1 |
| Choline methosulfate | 1.2 |
| Isopropanol | 14 |

B. Solution

A polymer binder solution was prepared by mixing together in parts by weight:

| | |
|---|---|
| PMMA from Rohm and Haas Co. | 13 |
| Toluol | 18 |
| Methyl ethyl ketone (MEK) | 30 |
| Methyl isobutyl ketone (MIBK) | 8 |
| Propylene glycol methyl ether acetate (PGMEA) | 5 |
| Nuosperse ® 657 from Nuodex Inc. | .01 |

With constant stirring, 1.2 parts of fumed silica (Aerosil ® 200 from Degussa Corp.) were added to 25% of the B solution. Then 20% more of B solution was added and 3.0 parts of $TiO_2$ (Mobay Chemicals) were blended into the dispersion. The remainder of B was then added. Maintaining constant stirring, Solution A was blended into Solution B to prepare the coating composition.

An additional 13 parts of acetone was added and the composition was placed in a 16 oz. aerosol can which contained a fluorocarbon propellant.

The composition was sprayed onto a polyvinyl chloride surface to produce a uniform film of 2 mils thickness. When dry the opaque white samples were conditioned and tested.

A comparison test was performed with a 16 oz. can of Miller-Stephenson MS-482 to produce opaque grey samples.

TABLE 1

| Sample | Invention | Comparison |
|---|---|---|
| Surface Resistivity 50% RH | $1 \times 10^7$ | $>10^{13}$ |
| Surface Resistivity 15% RH | $1 \times 10^8$ | $>10^{13}$ |
| Appearance | White | Grey |

As shown, the invention produces a surface dissipative coating with superior electrical properties as well as more pleasing uniform and permanent white coating.

COMPARATIVE EXAMPLE 2

Compositions A, B, and C were prepared as in Example 1 except that only one antistat was used in each formulation. A contained only ethyl bis(polyethoxy ethanol) alkyl ammonium ethyl sulphate. B contained only fatty acid modified dimethyl-ethyl ammonium ethosulphate. C contained only choline methosulphate. Samples were spray coated on polyvinyl chloride, conditioned and tested as in Example 1. Table 2 gives results in which all formulations contain 3.2 parts by weight antistat.

TABLE 2

| Sample | Example 1 | A | B | C |
|---|---|---|---|---|
| Surface Resis. 50% RH | $1 \times 10^7$ | $5 \times 10^9$ | $1 \times 10^9$ | $5 \times 10^6$ |
| Surface Resist. 15% RH | $1 \times 10^8$ | $1 \times 10^{11}$ | $1 \times 10^{10}$ | $1 \times 10^8$ |
| Hygroscopic | NO | NO | NO | YES |
| Permanent | YES | YES | YES | NO |
| Uniform | YES | YES | YES | NO |
| Survive Damp Wipe | YES | YES | YES | NO |

Thus, while the electrical conductance of C would be satisfactory for ESD applications, the physical properties are inadequate. A and B have adequate physical properties but poor electrical conductance. Surprisingly, the combination in Example 1 gives better overall properties.

EXAMPLE 3

A composition was prepared as in Example 1 except that fumed silica (Aerosil® 200) was omitted from the formulation. The resulting composition was not completely homogeneous on standing as was the composition of Example 1. When tested as in Example 1, the surface resistivity was $1 \times 10^9$ (50% RH) and $1 \times 10^{10}$ (15% RH) showing that the inorganic particulate plays an important role in providing good electrical properties.

EXAMPLE 4

A composition was prepared as in Example 4 except that Aerosil® 200 (fumed silica) was omitted in order to increase surface gloss. As with Example 4, the composition was sprayed fresh and one week later with dilution. Table 3 contains results.

TABLE 3

| Coating | Thickness, Mils | Surface Resistivity (50% RH) |
|---|---|---|
| Fresh | 7.5 | $3.5 \times 10^7$ |
| One Week | 5 | $9.1 \times 10^6$ |

EXAMPLE 5

The solvent composition of Example 1 and the aqueous composition of Example 4 were both coated on polyvinyl chloride surfaces and allowed to dry to provide uniform coatings. At 50% RH both coatings gave surface resistivities of $1 \times 10^7$ ohm/sq indicating the compositions are effective both as spray and conventionally applied coatings.

EXAMPLES 6-8

Following the procedures of Example 1, three different coating compositions were prepared using different levels of choline methosulfate and a long chain quaternary ammonium salt. Each liquid coating mixture was 12% by wt. PMMA, 1.12% by wt. silica; and 2.698% by wt. TiO$_2$.

Solid films were prepared from these compositions, and the properties of the films were tested. (The films prepared were 64% by wt. PMMA, 5.9% silica, and 14.2% TiO$_2$.

Table 4 indicates the amounts of antistat present in both the coating composition and in the film of each example.

The surface resistivity of these films was measured according to the procedure previously described. The results for Examples 6-8 are given in Table 5 along with the properties of each film.

TABLE 5

|  | Example 6 | Example 7 | Example 8 |
|---|---|---|---|
| Surface Resistivity (50% RH) ohm/59. | $1 \times 10^8$ | $8 \times 10^6$ | $6 \times 10^6$ |
| Surface Resistivity (15% RH) ohm/59. | $1 \times 10^9$ | $1 \times 10^8$ | $1 \times 10^8$ |
| Film Properties: Hygroscopic | No | No | Yes |
| Permanent-Elect Act Still | Yes | Yes | Yes |
| Uniform | Yes | Yes | Yes |
| Survive Damp Wipe | Yes | Yes | Yes |

What is claimed is:

1. An antistat coating composition for giving surfaces a reduced electrical surface resistivity comprises a solvent vehicle in an amount of from about 40 to about 90% by weight; a choline antistat in an amount of about 0.5% to about 2% by weight; a long chain quaternary ammonium salt antistat; and a solvent-compatible binder in an amount of from about 1 to about 60% by weight of the total coating composition, further providing that the concentration ratio of the long chain quaternary ammonium salt antistat to the choline antistat is about 1 to about 2.5.

2. The coating composition of claim 1 that also contains a member selected from the group consisting of an inorganic particulate and a pigment.

3. The coating composition of claim 1 which also contains fumed silica, ZnO, or Al$_2$O$_3$.

4. The coating composition of claim 1 wherein the choline antistat is choline methosulphate, choline hydroxide, or choline chloride.

5. The coating composition of claim 2 having the inorganic particulate fumed silica and TiO$_2$ as a pigment.

6. The coating composition of claim 1 wherein the binder is selected from the group consisting of a polyurethane, a vinyl copolymer, an acetate polymer, an acrylate polymer, an acrylate copolymer, and an epoxy.

7. The coating composition of claim 6 wherein the binder is either an acrylate polymer or an acrylate copolymer.

8. The coating composition of claim 1 wherein the long chain quaternary ammonium salt antistat is cocotrimethyl ammonium chloride, ethyl bis(polyethoxy ethanol) alkyl ammonium ethyl sulphate, or fatty acid modified dimethyl-ethyl ammonium ethosulphate.

9. The coating composition of claim 1 wherein the solvent is present in an amount of from about 70 to 80%

TABLE 4

|  | Example 6 | | Example 7 | | Example 8 | |
|---|---|---|---|---|---|---|
|  | Wt % in Coating Solution | Wt % in Solid Film | Wt % in Coating Solution | Wt % in Solid Film | Wt % in Coating Solution | Wt % in Solid Film |
| Long chain quat[1] | 1.14 | 6.0 | .76 | 4.0 | .38 | 2.0 |
| Long chain quat[2] | 1.14 | 6.0 | .76 | 4.0 | .38 | 2.0 |
| Choline Antistat[3] | .74 | 3.91 | 1.50 | 7.9 | 2.26 | 11.9 |

[1] is Ethyl bis (Polyethoxyethanol) Alkyl Ammonium Ethyl Sulphate
[2] is Dimethyl-ethyl Ammonium Ethosulphate
[3] is Choline Methosulphate by weight; the choline is present in an amount of from about 1 to about 1.5% by weight; and the long chain quat is present in an amount of from about 1.6 to about 2.4% by weight.

10. The coating composition of claim 1 wherein the binder is dissolved.

11. The coating composition of claim 10 which is a sprayable coating composition.

12. The coating composition of claim 1 which also contains a member selected from the group consisting of a thickener, surfactant, and a defoamer.

13. The coating composition of claim 1 which is packaged as an aerosol spray.

14. A non-aqueous antistatic coating composition comprises (1) 1-1.5 parts of a choline antistat, (2) 1.6-2.4 parts of one or more long chain quarternary ammonium antistat, (3) 70-90 parts of a solvent vehicle, (4) a polymer binder, and (5) an inorganic particulate, with the parts by weight of (1)-(5) totalling to an amount in the range of from 87.1 to 123.9.

* * * * *